United States Patent [19]
Woldhuis

[11] Patent Number: 5,534,236
[45] Date of Patent: Jul. 9, 1996

[54] REMOVING AMMONIA FROM AN AMMONIA-CONTAINING GAS MIXTURE

[75] Inventor: Alex F. Woldhuis, Amsterdam, Netherlands

[73] Assignee: Shell Oil Company, Houston, Tex.

[21] Appl. No.: 495,746

[22] Filed: Jun. 27, 1995

[30] Foreign Application Priority Data

Apr. 18, 1994 [EP] European Pat. Off. ............. 94201068

[51] Int. Cl.$^6$ .................................................. C01C 3/00
[52] U.S. Cl. .................................................. 423/237
[58] Field of Search ................................. 423/237, 351

[56] References Cited

U.S. PATENT DOCUMENTS

| | | | |
|---|---|---|---|
| 4,081,510 | 3/1978 | Kato et al. .......................... | 423/237 |
| 4,744,962 | 5/1988 | Johnson et al. .................... | 423/237 |
| 4,755,282 | 7/1988 | Samish et al. ...................... | 423/237 |

FOREIGN PATENT DOCUMENTS 0290947  4/1988  European Pat. Off. .

OTHER PUBLICATIONS

Jul. 1995 Search Report—European Patent Office.

*Primary Examiner*—Wayne Langel
*Attorney, Agent, or Firm*—Kim Muller

[57] ABSTRACT

A process of removing ammonia from an ammonia-containing gas mixture including introducing a precursor of nitrogen oxides into the gas mixture at a temperature above the decomposition temperature of the precursor and subsequently contacting the gas steam with a catalyst composition which catalyses the reduction of nitrogen oxides in the presence of ammonia to obtain a gas mixture having a reduced ammonia content.

1 Claim, 1 Drawing Sheet

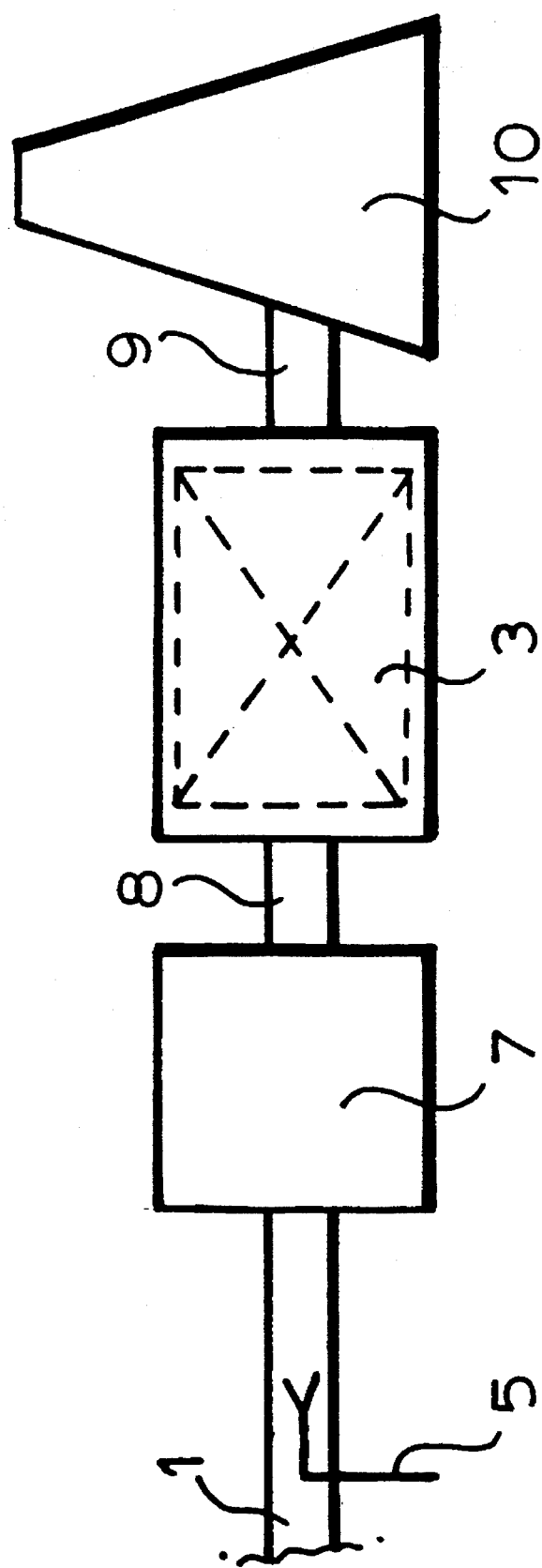

REMOVING AMMONIA FROM AN AMMONIA-CONTAINING GAS MIXTURE

FIELD OF THE INVENTION

The invention relates to a process of removing ammonia from an ammonia-containing gas mixture by means of oxidation in the presence of a catalyst composition which catalyses the reduction of nitrogen oxides in the presence of ammonia. The amount of ammonia in such a gas mixture is in the range of from 1 ppmv (part per million by volume) to 90% v (per cent by volume), and typically the amount of ammonia is in the range of from 100 ppmv to 2% v.

BACKGROUND OF THE INVENTION

European patent application publication No. 393 917 discloses a process of removing excess ammonia by oxidizing the ammonia with molecular oxygen in the presence of a metal promoted zeolite. According to this publication, the oxidation of ammonia with molecular oxygen takes place in the presence of an iron promoted zeolite at temperatures above 500° C. However, in the presence of the same catalyst the catalytic reduction of nitrogen oxides in the presence of ammonia takes place at about 350° C., which is a much lower temperature.

It is an object of the present invention to provide a process of removing ammonia from an ammonia-containing gas mixture by means of oxidation which can be carried out at substantially the same temperature as catalytic reduction of nitrogen oxides.

SUMMARY OF THE INVENTION

To this end the process of removing ammonia from an ammonia-containing gas mixture according to the present invention comprises introducing a precursor of nitrogen oxides into the gas mixture at a temperature above the decomposition temperature of the precursor and subsequently contacting the gas mixture in a reactor with a catalyst composition which catalyses the reduction of nitrogen oxides in the presence of ammonia to obtain a gas mixture having a reduced ammonia content.

BRIEF DESCRIPTION OF THE DRAWINGS

FIG. 1 is a schematic of the process in one embodiment of the invention.

DETAILED DESCRIPTION OF THE PREFERRED EMBODIMENTS

In the specification and in the claims the expression 'precursor of nitrogen oxides' is used to refer to a compound from which nitrogen oxides are formed by decomposition, wherein nitrogen oxides are suitable selected from the group containing NO and $NO_2$.

A suitable precursor of nitrogen oxides is nitric acid. A further suitable precursor is an aqueous solution of nitric acid, the concentration of nitric acid in water is not critical, suitably the concentration of nitric acid is between 20 and 60 per cent by mass. On heating at atmospheric pressure to a temperature above about 50° C. nitric acid will decompose into water, nitrogen dioxide and molecular oxygen. Above about 150° C. nitrogen monoxide is formed as well.

Another suitable precursor is a nitrate or a nitrite, or an aqueous solution of a nitrate or a nitrite. Suitable salts are those that are stable below about 50° C. and that decompose below about 500° C. and preferably below 200° C.; examples of suitable cations of such salts are cobalt, iron, lead, magnesium and nickel. A further suitable precursor is nitrous acid or an aqueous solution of nitrous acid, which nitrous acid decomposes into nitric acid, nitrogen monoxide and water.

Unless otherwise stated, the temperature at which the nitrogen oxide precursor decomposes is the decomposition temperature at the pressure of the ammonia-containing gas mixture. To achieve decomposition of the precursor dispersed in the ammonia-containing gas mixture, the temperature of the dispersed precursor should be above its decomposition temperature. This can be achieved by heating the precursor to above its decomposition temperature before introducing it in the gas mixture. On the condition that the temperature of the ammonia-containing gas mixture is sufficiently high, this can also be achieved by allowing the gas mixture to heat the precursor to above its decomposition temperature.

Suitably a catalyst composition is used that catalyses the reduction of nitrogen oxides in the presence of ammonia, for example a catalyst composition containing a noble metal (platinum, rhodium, ruthenium, palladium) or a metal of the iron group (iron, cobalt, nickel), or a catalyst composition containing oxides of vanadium, titanium, tungsten or molybdenum. The catalyst composition can include a support, for example silica or alumina, or mixtures.

A further suitable catalyst composition is a metal promoted zeolite such as described in European patent application publication No. 393 917.

Another suitable catalyst composition includes titanium and vanadium compounds as described in European patent specification No. 217 446.

The temperature at which the gas steam is contacted with the catalyst composition which catalyses the reduction of nitrogen oxides in the presence of the above catalysts is in the range of from 120° to 350° C.

DETAILED DESCRIPTION OF THE DRAWINGS

The invention will now be described by way of example in more detail with reference to the accompanying drawing showing schematically a layout of the process of the invention.

Through conduit 1 an ammonia-containing gas mixture at a temperature in the range of 200° C. is passed towards reactor 3. A precursor of nitrogen oxides, in the form of aqueous nitric acid, is introduced through distributor 5 in the gas mixture passing through conduit 1. The precursor is dispersed in the ammonia-containing gas mixture as the gas mixture passes via mixing vessel 7 and conduit 8 to the reactor 3, and because the temperature of the ammonia-containing gas mixture is above the decomposition temperature of the precursor nitrogen oxides are formed. As a result a mixture of the ammonia-containing gas and nitrogen oxides is supplied to the reactor 3.

Reactor 3 is filled with a catalyst composition which catalyses the reduction of nitrogen oxides in the presence of ammonia at a temperature in the range of from 120° to 350° C. From the reactor 3 a gas mixture having a reduced ammonia content is withdrawn, this gas mixture is supplied via conduit 9 to chimney 10, through which the gas mixture is vented.

The amount of precursor is determined by the amount of ammonia that has to be removed from the ammonia-containing gas mixture. The system as shown in the drawing can be provided with means to control the amount of precursor supplied to the ammonia-containing gas mixture. For the sake of simplicity the system has not been shown in the drawing.

When the temperature of the gas mixture is below the temperature at which the reduction of nitrogen oxides is catalysed, the ammonia-containing gas mixture has to be heated. Suitably a heater is installed upstream of the location where the precursor is introduced into the ammonia-containing gas mixture.

When the temperature of the ammonia-containing gas mixture is below the decomposition temperature of the precursor of nitrogen oxides, the precursor has to be heated to above its decomposition temperature before it is introduced into the ammonia-containing gas mixture.

The above described oxidation of ammonia with nitrogen oxides can precede the oxidation of ammonia with molecular oxygen, this two-stage process is suitably applied when the ammonia-containing gas contains already molecular oxygen. In this two-stage process both oxidation reactions take place in the same reactor. The oxidation of ammonia with nitrogen oxides starts at a lower temperature than the temperature at which the oxidation of ammonia with molecular oxygen starts. As the oxidation of ammonia is an exothermic reaction, the catalyst composition in the reactor is heated; the temperature above which the oxidation of ammonia with nitrogen oxides starts plus the adiabatic temperature increase is above the temperature at which the oxidation of ammonia with molecular oxygen is supported. The two-stage process of removing ammonia from an ammonia-containing gas mixture which ammonia-containing gas mixture further contains molecular oxygen then comprises introducing a precursor of nitrogen oxides into the gas mixture at a temperature above the decomposition temperature of the precursor and subsequently contacting the gas mixture in a reactor with a catalyst composition which catalyses the reduction of nitrogen oxides in the presence of ammonia to obtain a gas mixture having a reduced ammonia content, and then interrupting the introduction of precursor into the ammonia-containing gas mixture and allowing molecular oxygen to oxidize ammonia in the reactor. The application of this two-stage process has two advantages. As the temperature at which the oxidation of ammonia with nitrogen oxides starts is lower than the temperature at which the oxidation of ammonia with molecular oxygen starts, less heat has to be supplied to the ammonia-containing gas mixture which implies that a smaller heater can be used; and as the oxidation of ammonia is an exothermic reaction, the catalyst composition in the reactor is heated and with time the temperature in the reactor will rise to a level sufficient to support the oxidation with molecular oxygen. Interrupting the introduction of precursor is done when the temperature in the reactor has reached the level required to support the oxidation of ammonia with molecular oxygen.

I claim:

1. In a process for removing ammonia from an ammonia-containing gas mixture containing molecular oxygen which comprises introducing a precursor of nitrogen oxides, selected from the group consisting of nitric acid, a nitrate, a nitrite and aqueous solutions of said nitric acid, nitrate or nitrite, into said gas mixture containing ammonia at a temperature above the decomposition temperature of said chosen precursor and subsequently contacting the mixture of gases in a reactor in the presence of a catalyst to obtain a gas mixture having a reduced ammonia content, the improvement which consists of interrupting the introduction of the precursor into said gas mixture for a period of time to allow said molecular oxygen to oxidize said ammonia in said reactor.

* * * * *